(12) United States Patent
Schultz et al.

(10) Patent No.: US 8,199,750 B1
(45) Date of Patent: Jun. 12, 2012

(54) COMMUNICATING WITH A CONTROL PLANE USING A FORWARDING INFORMATION FORMAT AND CONTROL PLANE PROCESSING OF PACKETS DEVOID OF A VIRTUAL SWITCH IDENTIFIER

(75) Inventors: Andrew Patrick Schultz, Spokane, WA (US); David Henry Gilson, Honolulu, HI (US); Keith Michael Bly, Newman Lake, WA (US); Kelly Donald Fromm, Newman Lake, WA (US); Dennis Lee Weaver, Spokane, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 545 days.

(21) Appl. No.: 11/958,897

(22) Filed: Dec. 18, 2007

(51) Int. Cl.
*H04L 12/56* (2006.01)
*G06F 15/173* (2006.01)

(52) U.S. Cl. .................. 370/389; 370/466; 709/223

(58) Field of Classification Search .................. None
See application file for complete search history.

(56) References Cited

U.S. PATENT DOCUMENTS

| | | | | |
|---|---|---|---|---|
| 5,550,816 A * | 8/1996 | Hardwick et al. | ........... | 370/397 |
| 6,434,612 B1 * | 8/2002 | Hughes et al. | ........... | 709/223 |
| 6,628,649 B1 * | 9/2003 | Raj et al. | ........... | 370/360 |
| 6,647,428 B1 * | 11/2003 | Bannai et al. | ........... | 709/245 |
| 6,658,022 B1 * | 12/2003 | West et al. | ........... | 370/467 |
| 6,680,952 B1 * | 1/2004 | Berg et al. | ........... | 370/467 |
| 6,807,175 B1 * | 10/2004 | Jennings et al. | ........... | 370/390 |
| 6,873,620 B1 * | 3/2005 | Coveley et al. | ........... | 370/395.31 |
| 6,915,521 B1 * | 7/2005 | Monteiro | ........... | 709/223 |
| 6,999,454 B1 * | 2/2006 | Crump | ........... | 370/389 |
| 7,430,208 B1 * | 9/2008 | Patra et al. | ........... | 370/395.1 |
| 7,653,056 B1 * | 1/2010 | Dianes et al. | ........... | 370/389 |
| 7,706,316 B1 * | 4/2010 | Kuik | ........... | 370/320 |
| 7,760,723 B1 * | 7/2010 | Daines et al. | ........... | 370/389 |
| 7,764,621 B1 * | 7/2010 | Busch et al. | ........... | 370/249 |
| 8,018,880 B2 * | 9/2011 | Figueira et al. | ........... | 370/285 |
| 2003/0084219 A1 * | 5/2003 | Yao et al. | ........... | 710/300 |
| 2003/0140168 A1 * | 7/2003 | Peshkin et al. | ........... | 709/245 |
| 2004/0024903 A1 * | 2/2004 | Costatino et al. | ........... | 709/238 |
| 2004/0131079 A1 * | 7/2004 | Hegde et al. | ........... | 370/466 |
| 2004/0215758 A1 * | 10/2004 | Kompella et al. | ........... | 709/223 |
| 2004/0218542 A1 * | 11/2004 | Lee | ........... | 370/248 |
| 2005/0041665 A1 * | 2/2005 | Weyman et al. | ........... | 370/390 |
| 2005/0063395 A1 * | 3/2005 | Smith et al. | ........... | 370/399 |
| 2005/0265355 A1 * | 12/2005 | Havala et al. | ........... | 370/395.53 |
| 2006/0005185 A1 * | 1/2006 | Nguyen | ........... | 718/1 |
| 2006/0007939 A1 * | 1/2006 | Elangovan | ........... | 370/395.53 |
| 2006/0262728 A1 * | 11/2006 | Addeo et al. | ........... | 370/248 |
| 2007/0067432 A1 * | 3/2007 | Tarui et al. | ........... | 709/223 |
| 2007/0115962 A1 * | 5/2007 | Mammoliti et al. | ........... | 370/389 |
| 2007/0140202 A1 * | 6/2007 | Calhoun et al. | ........... | 370/338 |

(Continued)

*Primary Examiner* — Ayaz Sheikh
*Assistant Examiner* — Timothy J Weidner
(74) *Attorney, Agent, or Firm* — Clements Bernard PLLC; Christopher L. Bernard; Lawrence A. Baratta, Jr.

(57) ABSTRACT

Packet switch operating methods and packet switches receive a plurality of packets using a forwarding plane of the packet switch. Each packet of the plurality conforms to a different one of a plurality of forwarding information formats. The methods and packet switches modify each packet of the plurality to conform to a common forwarding information format instead of a respective one of the plurality of forwarding information formats and forward the modified packets of the plurality to a control plane of the packet switch.

25 Claims, 7 Drawing Sheets

U.S. PATENT DOCUMENTS

| | | | |
|---|---|---|---|
| 2007/0237156 A1* | 10/2007 | Wang | 370/395.5 |
| 2008/0031266 A1* | 2/2008 | Tallet et al. | 370/401 |
| 2008/0037559 A1* | 2/2008 | Eriksson | 370/395.53 |
| 2008/0059697 A1* | 3/2008 | Sakaki et al. | 711/112 |
| 2008/0144644 A1* | 6/2008 | Allan et al. | 370/401 |
| 2008/0159277 A1* | 7/2008 | Vobbilisetty et al. | 370/357 |
| 2008/0253299 A1* | 10/2008 | Damm et al. | 370/252 |
| 2008/0310430 A1* | 12/2008 | He | 370/400 |
| 2009/0016365 A1* | 1/2009 | Sajassi et al. | 370/401 |
| 2009/0041023 A1* | 2/2009 | Ould Brahim et al. | 370/395.3 |
| 2009/0059800 A1* | 3/2009 | Mohan | 370/241.1 |
| 2009/0059914 A1* | 3/2009 | Khalid et al. | 370/389 |
| 2009/0073989 A1* | 3/2009 | Cai et al. | 370/395.53 |
| 2009/0122801 A1* | 5/2009 | Chang | 370/395.53 |
| 2009/0141703 A1* | 6/2009 | Ghodrat et al. | 370/352 |
| 2010/0020797 A1* | 1/2010 | Casey et al. | 370/390 |

* cited by examiner

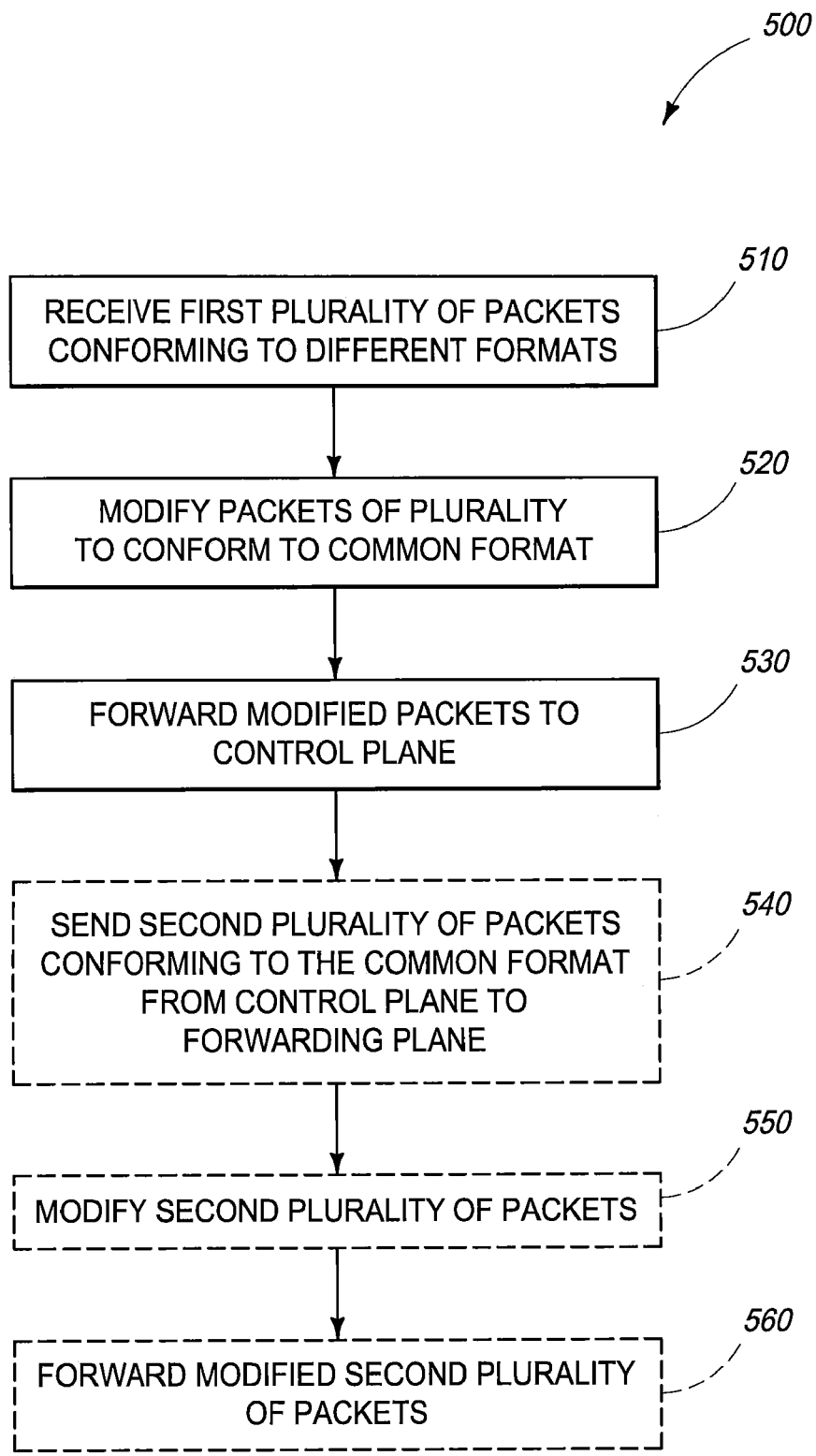

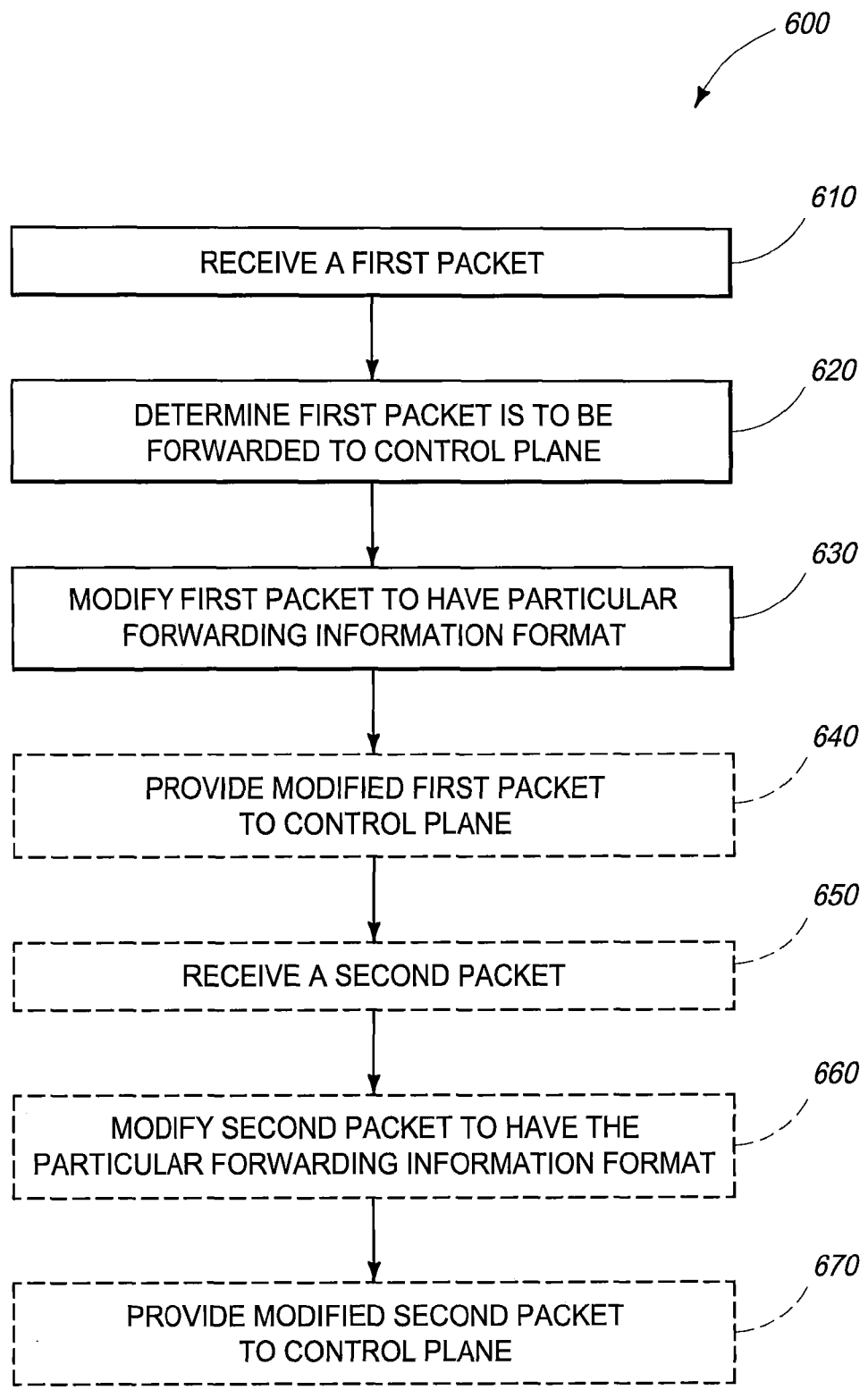

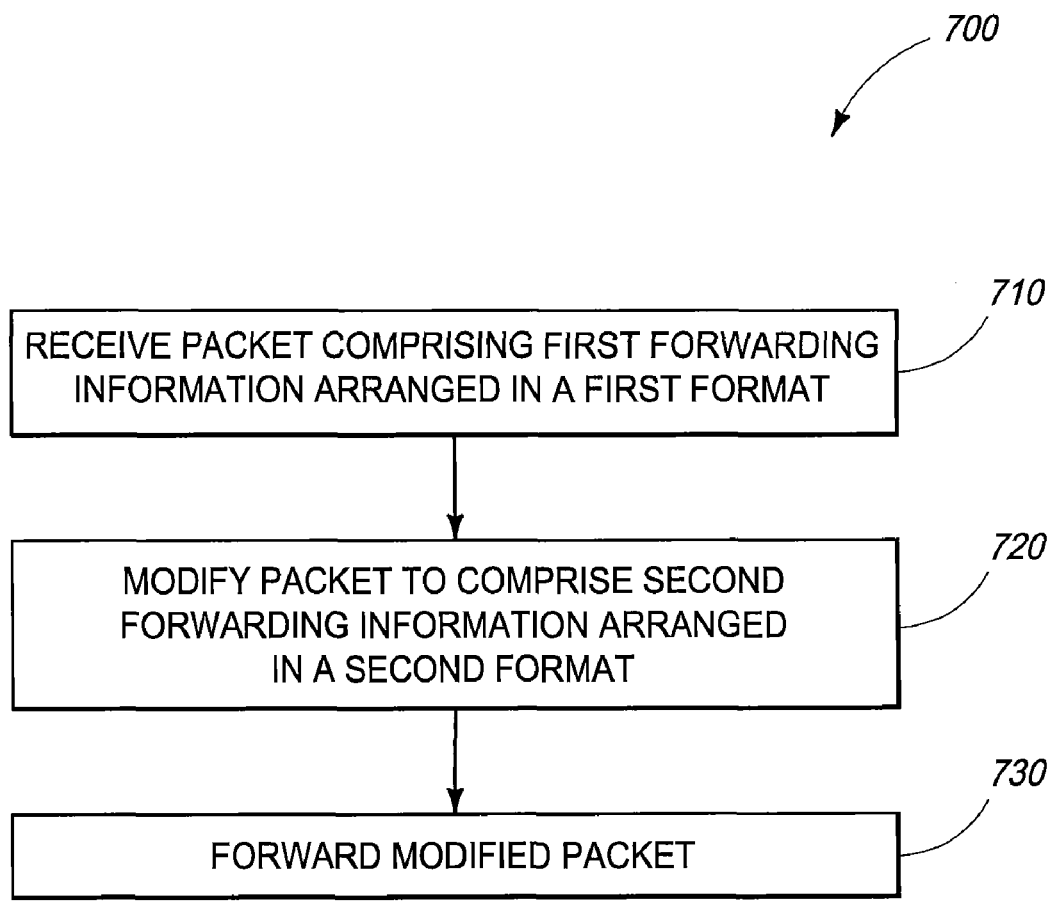

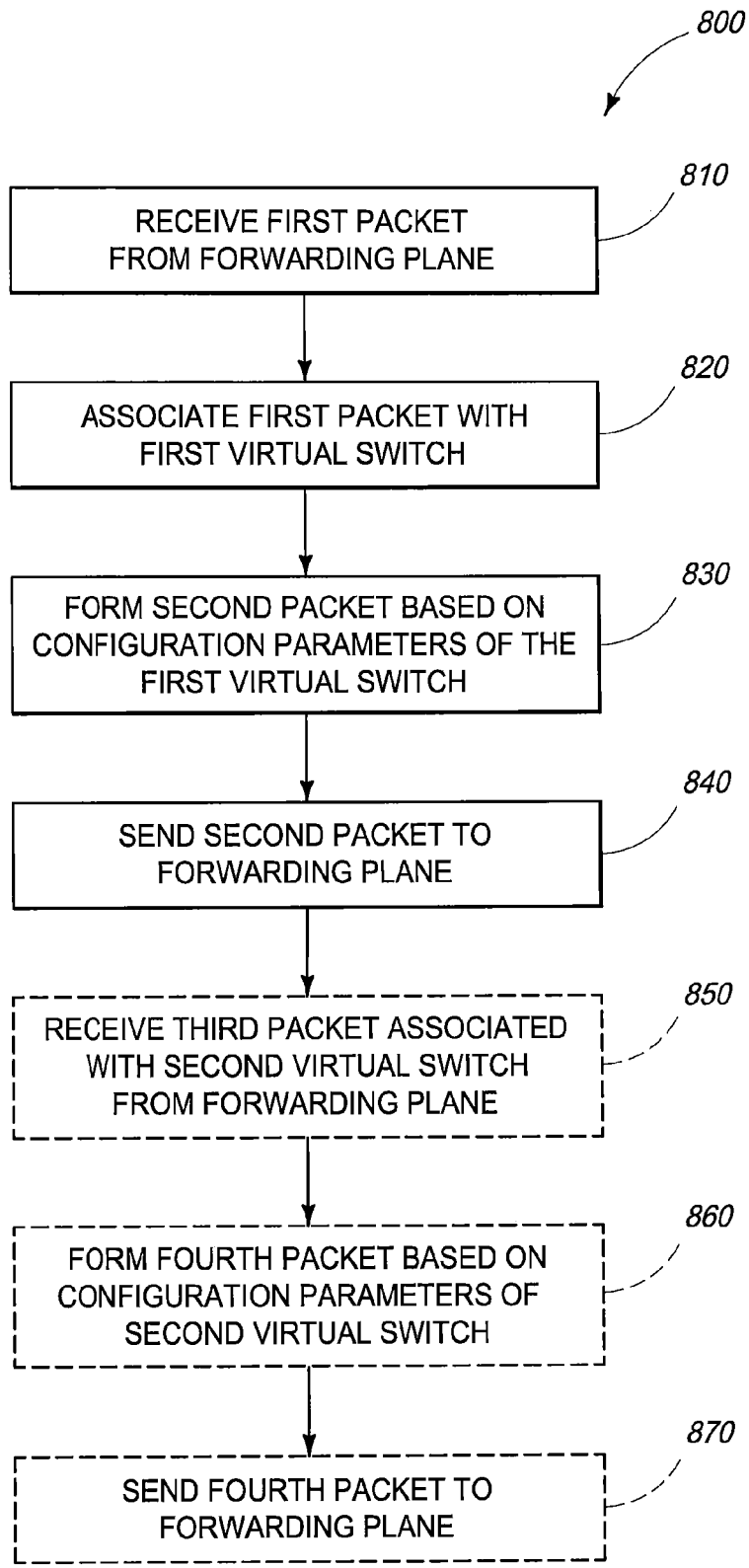

COMMUNICATING WITH A CONTROL PLANE USING A FORWARDING INFORMATION FORMAT AND CONTROL PLANE PROCESSING OF PACKETS DEVOID OF A VIRTUAL SWITCH IDENTIFIER

TECHNICAL FIELD

The present invention, in various embodiments, relates to communicating with a control plane using a forwarding information format and control plane processing of packets devoid of a virtual switch identifier.

BACKGROUND OF THE INVENTION

A packet switch may be logically and/or physically separated into a forwarding plane and a control plane. The forwarding plane may forward a packet received on one port of the packet switch to one or more other ports of the packet switch based at least on a destination address of the packet. The packet may be addressed to a device in communication with the packet switch.

However, some packets received by the packet switch may be addressed to the packet switch itself. The forwarding plane may forward these packets to the control plane, which may subsequently process these packets. Other packets may also be forwarded to the control plane. For example, layer-two control protocol packets may be forwarded to the control plane.

In some configurations, an amount of time consumed by the forwarding plane in forwarding a packet to a destination port of the packet switch may be significantly less than an amount of time consumed by the control plane in receiving a packet from the forwarding plane and processing the received packet. This time difference may be especially large if the forwarding plane is implemented primarily in hardware and the control plane is implemented primarily by a processor executing software.

BRIEF DESCRIPTION OF THE DRAWINGS

Preferred embodiments of the invention are described below with reference to the following accompanying drawings.

FIG. 5 is a flow chart illustrating a method according to one embodiment.
FIG. 6 is a flow chart illustrating a method according to one embodiment.
FIG. 7 is a flow chart illustrating a method according to one embodiment.
FIG. 8 is a flow chart illustrating a method according to one embodiment.

DETAILED DESCRIPTION OF THE PREFERRED EMBODIMENTS

Figure 1:
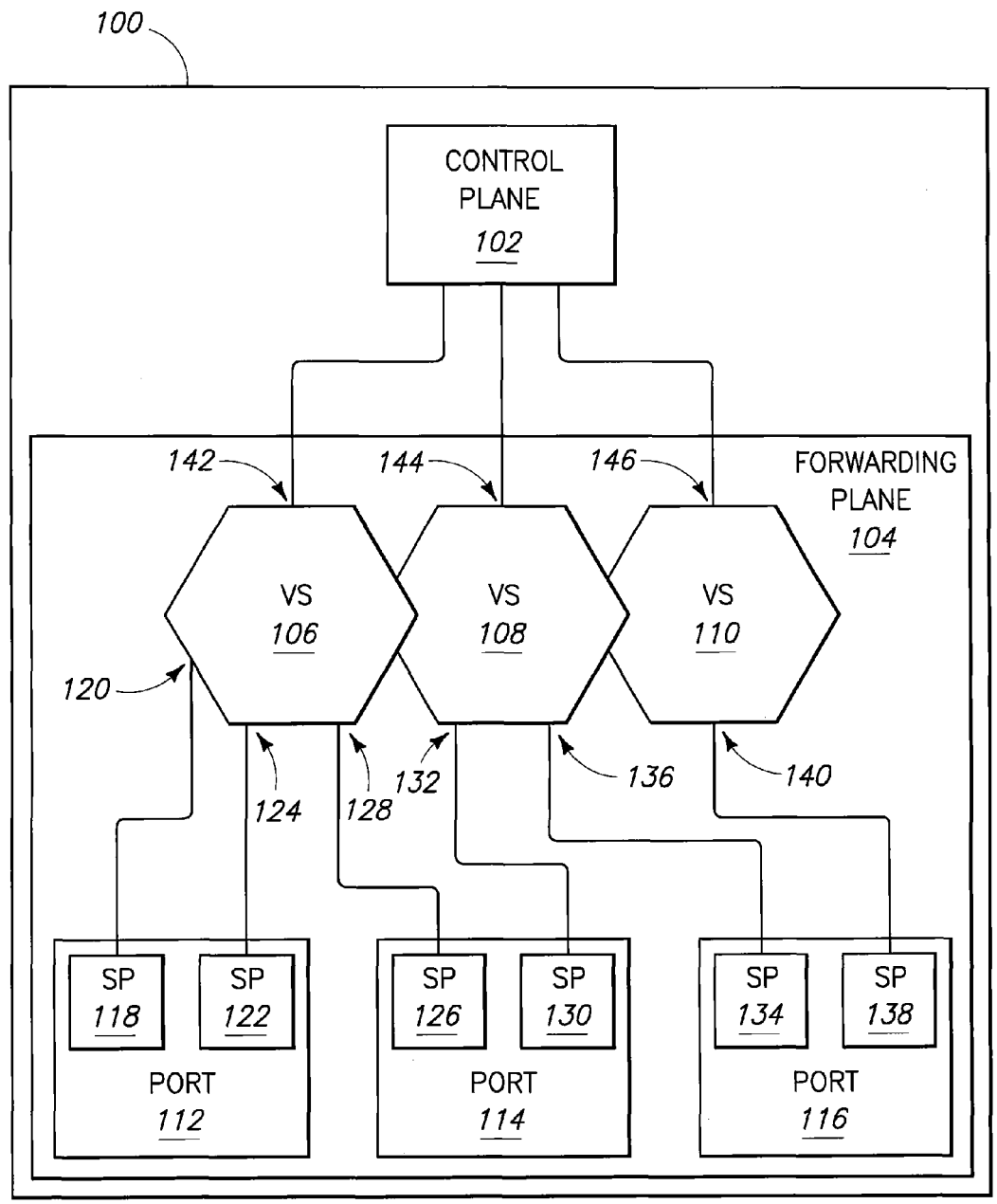
FIG. 1 is a logical block diagram of a packet switch.

According to one aspect of the invention, a packet switch includes ports configured to send and receive packets, control circuitry, and forwarding circuitry connected to the ports and to the control circuitry. The control circuitry may be physically distinct from the forwarding circuitry and the control circuitry might not be directly connected to the ports.

The forwarding circuitry is configured to receive a plurality of packets from the ports, each packet of the plurality having a different forwarding information format. The forwarding circuitry is further configured to modify each of the packets of the plurality to have a common forwarding information format instead of the different forwarding information formats and to forward the modified packets of the plurality to the control circuitry. The forwarding circuitry may be configured to forward packets received from the control circuitry to one or more of the ports.

According to another aspect of the invention, a packet switch operating method includes, using a forwarding plane of the packet switch, receiving a plurality of packets. Each packet of the plurality conforms to a different one of a plurality of forwarding information formats. By way of example, each of the forwarding information formats of the plurality may have a different bit length. The forwarding information formats of the plurality of formats may include an Ethernet destination address field and an Ethernet source address field.

The method also includes modifying each packet of the plurality to conform to a common forwarding information format instead of a respective one of the plurality of forwarding information formats and forwarding the modified packets of the plurality to a control plane of the packet switch. The common forwarding information format may consist of an Ethernet destination address field and an Ethernet source address field.

Each packet of the plurality may be associated with a different one of a plurality of virtual switches of the forwarding plane. Alternatively, each packet of the plurality may be associated with a common virtual switch but with a different one of a plurality of virtual interfaces associated with the common virtual switch.

The packet switch may process additional packets. For example, the plurality of packets may be referred to as a first plurality of packets and the method may further include, in response to the forwarding, sending a second plurality of packets from the control plane to the forwarding plane. Each packet of the second plurality may conform to the common forwarding information format. The method may further include using the forwarding plane, modifying each packet of the second plurality to conform to a different one of the plurality of forwarding information formats and forwarding the modified packets of the second plurality to at least one port of the packet switch.

According to another aspect of the invention, a packet switch operating method includes using a forwarding plane of the packet switch, receiving a packet comprising forwarding information. The forwarding plane is configured to forward the packet to one or more ports of the packet switch and/or to a control plane of the packet switch based on the forwarding information. The control plane may be configured to generate another packet in response to receiving and processing the modified packet.

The method also includes, using the forwarding plane, determining that the packet is to be forwarded to the control plane; subsequent to the determining, modifying the packet to have a particular forwarding information format; and providing the modified packet to the control plane. The control plane may be configured to modify a configuration of the forwarding plane based on contents of the modified packet.

The determining may include determining based on a portion of the packet that does not include the forwarding information. The modifying may include removing one of a Virtual Local Area Network (VLAN) identifier, a Multiprotocol Label Switching (MPLS) label, or a service instance identifier (I-SID) identifier from the packet.

The packet may be referred to as a first packet and prior to the modifying, the forwarding information of the first packet may be arranged in an original forwarding information format different than the particular forwarding information format. The method may also include using the forwarding plane, receiving a second packet comprising second forwarding information different than the first forwarding information. The second forwarding information may be arranged in the original forwarding information format. The method may also include modifying the second packet to have the particular forwarding information format and providing the modified second packet to the control plane.

The packet may include an Institute of Electrical and Electronics Engineers (IEEE) 802.1 ag connectivity fault management protocol data unit (CFMPDU), an International Telecommunications Union—Telecommunications (ITU-T) Y.1731 Ethernet OAM packet, or an Internet Group Management Protocol (IGMP) packet. Furthermore, the packet may be addressed to an Internet Protocol interface of the control plane.

According to another aspect of the invention, a packet switch operating method includes using a forwarding plane of the packet switch, receiving a packet from a control plane of the packet switch. The packet is created by the control plane and the packet includes first forwarding information arranged in a first format. The first forwarding information may include an Ethernet destination address and an Ethernet source address.

The method further includes using the forwarding plane, modifying the packet to comprise second forwarding information arranged in a second format. Prior to the modifying, the packet may be devoid of a VLAN identifier, an MPLS label, and an I-SID. The second format is different than the first format and at least a portion of the second forwarding information is not included in the first forwarding information. The modifying may include modifying without modifying an Ethernet source address or an Ethernet destination address of the packet. The method also includes using the forwarding plane, forwarding the modified packet to at least one port of the packet switch.

FIG. 1 is a logical block diagram of a packet switch 100. Packet switch 100 includes a control plane 102 and a forwarding plane 104. Forwarding plane 104 includes three ports 112, 114, and 116 and three virtual switches 106, 108, and 110. Of course, packet switch 100 may include other ports and virtual switches. Three ports and three virtual switches are illustrated for simplicity.

Forwarding plane 104 forwards packets between devices connected to packet switch 100 via ports 112, 114, and 116. In doing so, packet switch 100 may use virtual switches to create forwarding domains that restrict a number of ports to which a packet may be forwarded. For example, virtual switch 106 is associated with ports 112 and 114, but not with port 116. Accordingly, virtual switch 106 may forward packets it receives either to port 112 or to port 114, but not to port 116.

Packet switch 100 may use subparts in determining to which virtual switch a received packet should be associated. A subpart may be a subset of packets received or transmitted on a port that match criteria. For example, packets received or transmitted on a port that include a VLAN identifier having a value of 100 may be designated as one subpart and packets received or transmitted on the same port that include a VLAN identifier having a value of 200 may be designated as another subpart.

Of course, the criteria of a subpart may be based on something other than a value of a VLAN identifier. For example, subpart criteria may be based on a layer-two destination address, a layer-three destination address, a layer-four port number, an MPLS label, an I-SID, or other information.

Furthermore, a subpart may be associated with a forwarding information format. The forwarding information format may be an arrangement of fields of a packet. Received packets associated with a subpart may conform to a forwarding information format associated with the subpart. Likewise, packets associated with the subpart that are transmitted by the port associated with the subpart may also conform to the forwarding information format associated with the subpart.

As used herein, the term forwarding information refers to values of the fields of the forwarding information format of a packet. Some fields of the forwarding information format associated with a subpart may have particular values. For example, a forwarding information format associated with a subpart may specify that packets associated with the subpart include a VLAN identifier field having a particular value (e.g., 100).

Other fields of the forwarding information format associated with the subpart may have a variety of values. For example, the forwarding information format may include an Ethernet destination address field, but might not specify a particular value for the Ethernet destination address field. Accordingly, one packet associated with the subpart may include an Ethernet destination address field having a first value and another packet associated with the subpart may include an Ethernet destination address field having a different second value. Thus, an example forwarding information format may include an Ethernet destination address field having an unspecified value, an Ethernet source address field having an unspecified value, and a VLAN field having a particular value (e.g., 100).

Forwarding plane 104 may use the forwarding information of a packet in determining to which virtual interface of a virtual switch forwarding plane 104 should forward the packet.

Figure 2:
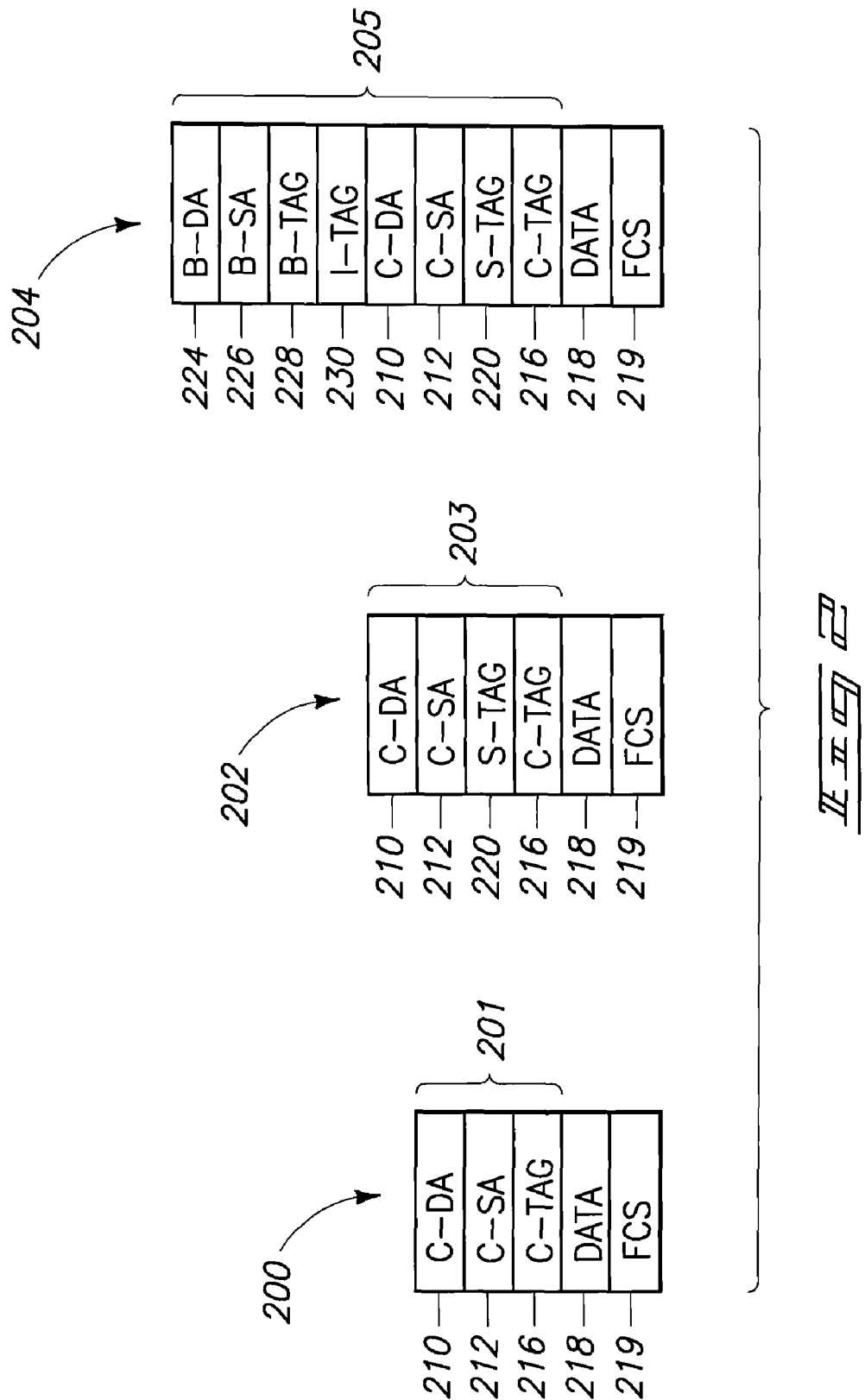
FIG. 2 is a chart illustrating a plurality of different packet formats.

FIG. 2 illustrates three example packet formats 200, 202, and 204. Each of the three packet formats includes a forwarding information format 201, 203, and 205 as well as a data field 218 and a frame check sequence field 219.

Forwarding information format 201 includes a customer destination address field 210, a customer source address field 212, and a customer VLAN tag field 216. Forwarding information format 210 may represent a known, single-VLAN tag format. In some cases, customer destination address field 210 may be referred to simply as a destination address field. Similarly, customer source address field 212 and customer VLAN tag field 216 may be respectively referred to as a source address field and a VLAN tag field. Forwarding information format 201 may further specify that customer VLAN tag field 216 has a particular value (e.g., 100) but might not specify values for customer destination address field 210 or customer source address field 212.

Forwarding information format 203 includes the customer destination address field 210, customer source address field 212, and customer VLAN tag field 216 of forwarding information format 201 and additionally includes a service VLAN tag field 220. Accordingly, forwarding information format 203 includes two VLAN tag fields and may be referred to as a stacked tag format or a double tag format. Forwarding information format 203 may conform to the IEEE 802.1 ad standard. Forwarding information format 203 may further specify that customer VLAN tag field 216 have a particular value (e.g., 2399) and that service VLAN tag field 220 have a particular value (e.g., 3000) but might not specify values for the customer destination address field 210 or the customer source address field 212.

Forwarding information format 205 includes customer destination address field 210, customer source address field 212, customer VLAN tag field 216, and service VLAN tag field 220 of forwarding information format 203. Forwarding information format 205 additionally includes a backbone destination address field 224, a backbone source address field 226, a backbone tag field 228, and a service identifier tag field 230. Accordingly, forwarding information format 205 includes two source address/destination address pairs and may be referred to as a MAC header encapsulated format. Forwarding information format 205 may conform to the IEEE 802.1 ah standard. Furthermore, forwarding information format 205 may be associated with a packet tunnel.

Forwarding information format 205 may further specify that backbone tag field 228 have a particular value (e.g., 1500) and that service identifier tag field 230 have a particular value (e.g., 99) but might not specify values for the customer destination address field 210, the customer source address field 212, the service VLAN tag field 220, or the customer VLAN tag field 216.

Of course, other forwarding information formats may also be used. These other forwarding information formats may include one or more of the fields described above and/or may include other fields not described above. These other fields may be fields that are used in forwarding a packet from a source device to a destination device.

Returning now to FIG. 1, forwarding plane 104 includes six subparts 118, 122, 126, 130, 134, and 138. Subparts 118 and 122 are associated with port 112, subparts 126 and 130 are associated with port 114, and subparts 134 and 138 are associated with port 116.

A subpart may be associated with a virtual switch using an interface of the virtual switch that may be referred to as a virtual interface. For example, subpart 118 is associated with virtual switch 106 via a virtual interface 120. Similarly, subparts 122, 126, 130, 134, and 138 are respectively associated with virtual interfaces 124, 128, 132, 136, and 140.

By way of example, packet switch 100 may receive a packet on port 112. Based on forwarding information of the received packet (e.g., a VLAN identifier), forwarding plane 104 may determine that the packet is associated with subpart 118. Consequently, forwarding plane 104 may associate the received packet with virtual switch 106. Since the packet is associated with subpart 118, forwarding plane 104 may select a destination for the packet from virtual interfaces 124 and 128 of virtual switch 106. Forwarding plane 104 may select a destination virtual interface for the packet based on all or portions of the forwarding information of the packet using known forwarding techniques. For example, forwarding plane 104 may use a learned address table or static address table associated with virtual switch 106 to determine to which of virtual interfaces 124 and 128 the received packet should be forwarded.

In one configuration, the subparts associated with a virtual switch may have identical forwarding information formats. For example, subparts 130 and 134 may both be associated with packet having a VLAN identifier value of 100. Consequently, forwarding plane 104 need not alter a packet received via subpart 130 of port 114 to have a different forwarding information format prior to forwarding the packet via virtual switch 108 to subpart 134 since subparts 130 and 134 may use the same forwarding information format.

In a different configuration, the subparts associated with a virtual switch may each have different forwarding information formats. For example, subpart 118 of virtual switch 106 may use forwarding information format 201, subpart 122 of virtual switch 106 may use forwarding information format 203, and subpart 126 of virtual switch 106 may use forwarding information format 205. Accordingly, when forwarding a packet from one subpart of virtual switch 106 to another subpart of virtual switch 106, forwarding plane 104 may modify the packet to have the forwarding information format of the subpart to which the packet is forwarded.

In some configurations, forwarding plane 104 might not need to inspect more than the forwarding information of a packet in order to forward the packet to one of the ports of packet switch 100. In some cases, forwarding plane 104 may recognize that a received packet should be forwarded to control plane 102 rather than to one of the ports of packet switch 100.

For example, if forwarding plane 104 receives a packet from one of ports 112, 114, or 116 that is addressed (via an Ethernet destination address and/or an Internet Protocol (IP) destination address) to an IP interface of packet switch 100, forwarding plane 104 may forward the packet to control plane 102. Packets addressed to the IP interface may include packets containing all or a portion of a packet switch management message such as a configuration command issued by a user, a network management system, or an element management system.

Other packets may be forwarded to control plane 102. For example, control protocol packets such as IGMP packets, CFMPDUs, and ITU-T Y.1731 Ethernet OAM packets may also be forwarded to control plane 102.

In some cases, forwarding plane 104 may forward control protocol packets to control plane 102 and may additionally forward the control protocol packets to other devices connected to one of the ports of packet switch 100. For example, if packet switch 100 is configured as a maintenance intermediate point, forwarding plane 104 may, upon receiving a CFMPDU, forward the CFMPDU to control plane 102 and may additionally forward the CFMPDU to a maintenance endpoint located on a packet switch connected to port 116.

Forwarding plane 104 may recognize packets that should be forwarded to control plane 102 by inspecting portions of packets as they are received. In doing so, forwarding plane 104 may inspect the forwarding information of the packets as well as other portions of the packets. For example, forwarding plane 104 may identify management packets by inspecting an IP destination address to determine whether a packet is addressed to the packet switch.

Upon receiving a packet from forwarding plane 104, control plane 102 may process the packet. In doing so, control plane 102 may modify a configuration of packet switch 100 or of forwarding plane 104. For example, upon receiving one or more packets conveying a request to create a new virtual switch, control plane 102 may configure forwarding plane 104 to have the new virtual switch.

Alternatively or additionally, after receiving a packet from forwarding plane 104, control plane 102 may generate a response packet. For example, upon receiving a CFMPDU containing a remote defect indicator, control plane 102 may transmit a packet containing a remote defect indicator.

In some configurations, control plane 102 may communicate with forwarding plane 104, but might not communicate with ports 112, 114, or 116 directly. Thus, control plane 102 may receive packets from forwarding plane 104 but might not receive packets directly from ports 112, 114, and 116 and may send packets to forwarding plane 104, but might not send packets directly to ports 112, 114, or 116.

Communications between control plane 102 and forwarding plane 104 may be logically represented as taking place using one or more virtual interfaces of the virtual switches of forwarding plane 104. Accordingly, virtual interface 142 represents an interface by which control plane 102 may exchange packets with forwarding plane 104 that are associated with virtual switch 106. Similarly, virtual interfaces 144 and 146 are respectively associated with virtual switches 108 and 110.

Virtual interfaces 142, 144, and 146 may each be associated with a common forwarding information format. In other words, packets sent or received using virtual interfaces 142, 144, and 146 may use the same forwarding information format.

Figure 3:
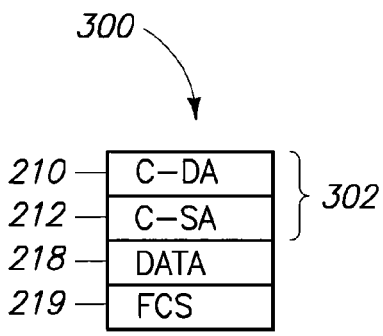
FIG. 3 is a chart illustrating another packet format.

FIG. 3 illustrates a packet format 300 including a forwarding information format 302. Forwarding information format 302 includes customer destination address 210 and customer source address 212. Note that forwarding information format 302 does not include a VLAN tag, MPLS label, or I-SID. Accordingly, forwarding information format 302 may be referred to as an "untagged format" that is devoid of a VLAN identifier, an MPLS label, and an I-SID. In one configuration, virtual interfaces 142, 144, and 146 may each be associated with forwarding information format 302. Of course, a format other than forwarding information format 302 could alternatively be associated with virtual interfaces 142, 144, and 146 that includes additional fields not present in forwarding information format 302. For example, forwarding information format 201 could be associated with virtual interfaces 142, 144, and 146 instead of forwarding information format 302.

Packet exchanges between forwarding plane 104 and control plane 102 will now be described. Returning to FIG. 1, forwarding plane 104 may receive a packet on port 112 and associate the packet with subpart 118 based on fields of the packet. The packet may have forwarding information format 201 since forwarding information format 201 is associated with subpart 118. Forwarding plane 104 may then determine that the packet should be forwarded to control plane 102 via virtual interface 142. However, since the packet has forwarding information format 201, and virtual interface 142 is associated with forwarding information format 302, forwarding plane 104 may modify the packet to have forwarding information format 302 prior to forwarding the packet to control plane 102.

Modifying the packet to have forwarding information format 302 may involve removing customer VLAN tag field 216 from the packet since forwarding information format 302 does not include customer VLAN tag field 216. Since forwarding information format 302 includes customer destination address 210 and customer source address 212, forwarding plane 104 might not modify the customer destination address and/or the customer source address of the received packet prior to forwarding the packet to control plane 102.

Upon receiving the packet, control plane 102 may form a response packet. The response packet may have forwarding information format 302. Control plane 102 may forward the response packet to forwarding plane 104. Forwarding plane 104 may then determine to which of virtual interfaces 120, 124, and 128 of virtual switch 106 the response should be forwarded. Forwarding plane 104 may make this determination based on forwarding information of the response packet.

If forwarding plane 104 determines that the response packet should be forwarded to port 112 via virtual interface 120, forwarding plane 104 may modify the response packet to have forwarding information format 201 since forwarding information format 201 is associated with subpart 118 and virtual interface 120. Similarly, if forwarding plane 104 determines that the response packet should be forwarded to port 112 via virtual interface 124, forwarding plane 104 may modify the response packet to have forwarding information format 203 since forwarding information format 203 is associated with subpart 122 and virtual interface 124.

Furthermore, if forwarding plane 104 determines that the response packet should be forwarded to port 114 via virtual interface 128, forwarding plane 104 may modify the response packet to have forwarding information format 205 since forwarding information format 205 is associated with subpart 126 and virtual interface 128.

In modifying the response packet, the forwarding plane might not modify the customer destination address and/or the customer source address of the response packet since forwarding information formats 201, 203, and 205 all include a customer destination address field and a customer source address field.

In some cases, forwarding plane 104 may determine that the response packet should be forwarded to virtual interfaces 120, 124, and 128. For example, forwarding to virtual interfaces 120, 124, and 128 may be appropriate if the response packet has a multicast destination address. In these cases, forwarding plane 104 may duplicate the response packet, modify one duplicate to have forwarding information format 201 and transmit this duplicate using port 112, modify another duplicate to have forwarding information format 203 and transmit this duplicate using port 112, and modify one duplicate to have forwarding information format 205 and transmit this duplicate using port 114. Consequently, two of the duplicates may be transmitted by a single port, port 112. However, the two duplicates transmitted by port 112 may have different forwarding information formats, namely forwarding information formats 201 and 203 and may consequently have different bit lengths.

Of course, control plane 102 need not receive a packet from forwarding plane 104 before control plane 102 sends a packet to forwarding plane 104. Instead, control plane 102 can send a packet to forwarding plane 104 without first receiving a packet from forwarding plane 104.

Furthermore, forwarding plane 104 may receive a packet on port 114 and associate the packet with subpart 126 based on fields of the packet. The packet may have forwarding information format 205 since forwarding information format 205 is associated with subpart 126. Forwarding plane 104 may then determine that the packet should be forwarded to control plane 102 via virtual interface 142. However, since the packet has forwarding information format 205, and virtual interface 142 is associated with forwarding information format 302, forwarding plane 104 may modify the packet to have forwarding information format 302 prior to forwarding the packet to control plane 102.

Modifying the packet to have forwarding information format 302 may involve removing backbone destination address field 224, backbone source address field 226, backbone tag field 228, service identifier tag field 230, service VLAN tag field 220, and customer VLAN tag field 216 from the packet since forwarding information format 302 does not include these fields.

Accordingly, packets exchanged by control plane 102 and forwarding plane 104 may have a common forwarding information format (e.g., forwarding information format 302). Using the common forwarding information format may provide several benefits. For example, the complexity of control plane 102 may be reduced by using the common forwarding information format when compared with forwarding packets having a variety of forwarding information formats to control plane 102. For example, if forwarding plane 104 forwarded packets to control plane 102 without first modifying the packets to be in the common forwarding information format, control plane 102 would potentially receive packets having six different forwarding information formats corresponding to virtual interfaces 120, 124, 128, 132, 136, and 140.

In order to inspect packets received from forwarding plane 104 and to properly form packets sent to forwarding plane 104, control plane 102 may need to know what each of the six different forwarding information formats are and may need to keep track of these six different forwarding information formats with respect to changes in the formats made by a user or management system. Placing such a burden on control plane 102 may reduce the speed with which control plane 102 is able to process packets, especially if control plane 102 is implemented using a processor and software.

In contrast, if forwarding plane 104 is implemented using hardware, such as an application specific integrated circuit, network processing unit, field programmable gate array, or other circuitry, forwarding plane 104 may quickly modify packets to be in the common forwarding information format prior to sending the packets to control plane 102 and may quickly modify packets received from control plane 102 to be in a corresponding one of the forwarding information formats associated with virtual interfaces 120, 124, 128, 132, 136, and 140.

Furthermore, using a common forwarding information format when communicating with control plane 102 may enable additional functionality to be added to control plane 102 without the functionality needing to be aware of the various forwarding information formats of virtual interfaces 120, 124, 128, 132, 136, and 140.

A further benefit of a common forwarding information format is that synchronization issues may be mitigated by the common format. For example, when using a common forwarding information format with control plane 102, if the forwarding information format associated with virtual interface 120 is modified by forwarding plane 104, control plane 102 need not be aware of the modification. In contrast, if control plane 102 receives packets from forwarding plane 104 having the forwarding information format associated with virtual interface 120 rather than the common forwarding information format, both control plane 102 and forwarding plane 104 may need to be notified of changes to the forwarding information format associated with virtual interface 120.

In this case, since two entities, control plane 102 and forwarding plane 104 are involved, there is a possibility that forwarding plane 104 could change the forwarding information format associated with virtual interface 120 and subsequently receive a packet associated with virtual interface 120 prior to control plane 102 being aware of the modification to the forwarding information format associated with virtual interface 120. Consequently, upon receiving the packet from forwarding plane 104, control plane 102 may discard the packet because it might not recognize the packet as being associated with virtual interface 120 since control plane 102 might not yet be aware of modifications to the forwarding information format associated with virtual interface 120.

Variations are also possible. For example, virtual interfaces 142, 144, and 146 may each have a different forwarding information format. Using different forwarding information formats for these interfaces may reduce or eliminate the benefits associated with using a single forwarding information format for virtual interfaces 142, 144, and 144 as described above. However, using three different forwarding information formats may still provide benefits over a configuration in which control plane 102 may receive packets having any of the forwarding information formats associated with virtual interfaces 120, 124, 128, 132, 136, and 140.

Although the discussion above is based on the use of virtual switches, other configurations are also possible. For example, a packet switch having a control plane and forwarding plane may use the forwarding plane to receive packets associated with a first routing interface that have a first forwarding information format and to receive packets associated with a second routing interface that have a different second forwarding information format. Prior to forwarding the packets to the control plane, the forwarding plane may modify the two packets so that both packets have a common forwarding information format such as forwarding information format 302.

According to another aspect of the invention, a packet switch operating method includes using a control plane of the packet switch, receiving a first packet from a forwarding plane of the packet switch. The forwarding plane includes a plurality of virtual switches. The forwarding plane associates the first packet with one virtual switch of the plurality and the first packet is devoid of an identifier of the one virtual switch. Accordingly, the control plane may be unable, based only on the first packet, to determine with which of the virtual switches the first packet is associated.

The method also includes, in response to the receiving, using the control plane to form a second packet based on configuration parameters of the one virtual switch. The second packet is devoid of the identifier of the one virtual switch. The method also includes using the control plane, sending the second packet to the forwarding plane.

The one virtual switch may be referred to as a first virtual switch and the method may further include using the control plane, receiving a third packet from the forwarding plane. The third packet may be associated with a different second virtual switch of the plurality and the third packet may be devoid of an identifier of the second virtual switch. The method may further include in response to the receiving, using the control plane to form a fourth packet based on configuration parameters of the second virtual switch. The fourth packet may be devoid of the identifier of the second virtual switch. The method may further include using the control plane, sending the fourth packet to the forwarding plane.

The method may further include using the forwarding plane, sending a message distinct from the first packet to the control plane informing the control plane that the first packet is associated with the one virtual switch.

Returning to FIG. 1, forwarding plane 104 may forward a packet associated with virtual switch 106 to control plane 102 via virtual interface 142. However, if the common forwarding information format used by virtual interfaces 142, 144, and 146 is forwarding information format 302, upon receiving the packet, control plane 102 might not be able to determine with which virtual switch the packet is associated. This is because forwarding information format 302 includes customer destination address 210 and customer source address 212, but does not include a tag or label identifying virtual switch 106.

However, to process the received packet, control plane 102 may need to know with which virtual switch the packet is associated. Accordingly, forwarding plane 104 may supply control plane 102 with metadata associated with the packet. The metadata may indicate that the packet is associated with virtual switch 106. The metadata may additionally convey other information such as the virtual interface or port from which the packet was received. Upon receiving the metadata, control plane 102 may associate virtual switch 106 with the packet it received from forwarding plane 104.

In response to receiving the packet, control plane 102 may form a response packet. If the response packet uses forwarding information format 302, forwarding plane 104 may be unable, based only on the packet, to determine with which virtual switch the packet is associated. Accordingly, control plane 102 may supply forwarding plane 104 with metadata associated with the response packet indicating that the response packet is associated with virtual switch 106.

Metadata may be sent from control plane 102 to forwarding plane 104 or from forwarding plane 104 to control plane 102 using a variety of techniques. For example, the metadata may be sent in a packet immediately prior to or subsequent to the packet the metadata is associated with. Alternatively, the metadata may be sent using a communication channel (e.g., a bus) that is separate from a communication channel used to send the packet associated with the metadata.

The metadata may alternatively be transmitted immediate prior to the packet or immediately after the packet. In this configuration, the metadata might not be considered part of the packet if fields of the packet, such as a length field or checksum field are not updated to reflect the appended metadata. In other words, the metadata might not be part of the packet, even if the metadata is transmitted adjacent in time to the packet, if a length field of the packet is not updated to reflect the appended metadata.

Accordingly, control plane 102 may receive a first packet conforming to forwarding information format 302 from virtual switch 106 and may receive a second packet conforming to forwarding information format 302 from virtual switch 108 and may be able to distinguish the two based on metadata supplied by forwarding plane 104. Similarly, forwarding plane 104 may receive a first packet conforming to forwarding information format 302 and associated with virtual switch 106 from control plane 102 and may receive a second packet conforming to forwarding information format 302 and associated with virtual switch 108 from control plane 102 and may be able to distinguish the two based on metadata supplied by control plane 102.

Figure 4:
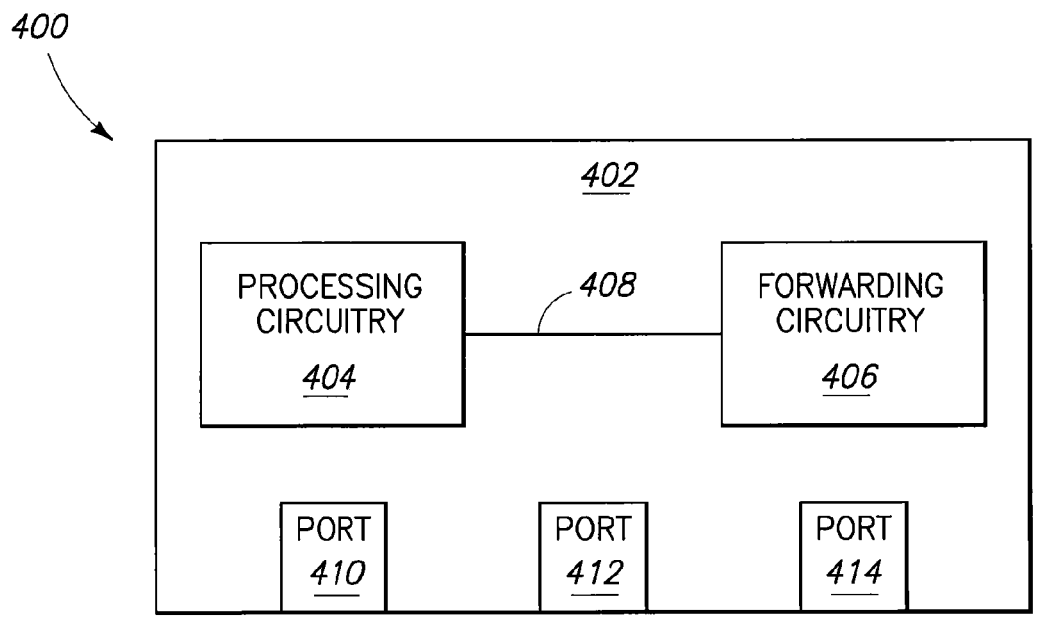
FIG. 4 is a block diagram of a packet switch.

FIG. 4 is a block diagram 400 of a packet switch 402. Packet switch 402 may include processing circuitry 404 and forwarding circuitry 406 connected by communications link 408. Packet switch 402 may also include ports 410, 412, and 414. Of course, packet switch 402 may include additional ports as well. Only three ports (ports 410, 412, and 414) are illustrated for simplicity.

Processing circuitry 404 may comprise one or more processors and memory storing programming. The one or more processors may be configured to execute the programming stored by the memory. Other configurations are also possible. For example, processing circuitry 404 may be implemented in a network processing unit, application specific integrated circuit, field programmable gate array, or other circuitry. Processing circuitry 404 may perform the functions associated with control plane 102 described above.

Forwarding circuitry 406 may comprise a network processing unit, application specific integrated circuit, field programmable gate array, or other circuitry. Forwarding circuitry 406 may perform the functions associated with forwarding plane 104 described above.

In one configuration, processing circuitry 404 may be physically distinct from forwarding circuitry 406. For example, processing circuitry 404 may be implemented by a first set of one or more integrated circuit chips and forwarding circuitry 406 may be implemented by a different second set of one or more integrated circuit chips. Alternatively, all or portions of processing circuitry 404 and forwarding circuitry 406 may be implemented by a single set of integrated circuit chips.

In one configuration, processing circuitry 404 might not be directly connected to any of ports 410, 412, or 414. Instead forwarding circuitry 406 may be directly connected to ports 410, 412, and 414. In this configuration, processing circuitry 404 may create a packet and send the packet to forwarding circuitry 406 via link 408. Forwarding circuitry 406 may then forward the packet to one or more of ports 410, 412, and 414.

Forwarding circuitry 406 and processing circuitry 404 may exchange packets using link 408. In one configuration, packets exchanged using link 408 may have a common forwarding information format such as forwarding information format 302.

Referring to FIG. 5, a method 500 is illustrated according to one embodiment. At 510, a forwarding plane receives a first plurality of packets conforming to different formats. At 520, the forwarding plane modifies the packets of the plurality to conform to a common format. At 530, the forwarding plane forwards the modified packets to the control plane. At 540, in one embodiment, the control plane sends a second plurality of packets conforming to the common format from the control plane to the forwarding plane. At 550, in one embodiment, the forwarding plane modifies the second plurality of packets. At 560, in one embodiment, the forwarding plane forwards the modified second plurality of packets.

Referring to FIG. 6, a method 600 is illustrated according to one embodiment. At 610, a forwarding plane receives a first packet. At 620, the forwarding plane determines that the first packet is to be forwarded to a control plane. At 630, the forwarding plane modifies the first packet to have a particular forwarding information format. At 640, in one embodiment, the forwarding plane provides the modified first packet to the control plane. At 650, in one embodiment, the forwarding plane receives a second packet. At 660, in one embodiment, the forwarding plane modifies the second packet to have the particular forwarding information format. At 670, in one embodiment, the forwarding plane provides the modified second packet to the control plane.

Referring to FIG. 7, a method 700 is illustrated according to one embodiment. At 710, a packet is received comprising first forwarding information arranged in a first format. At 720, the packet is modified to comprise second forwarding information arranged in a second format. At 730, the modified packet is forwarded.

Referring to FIG. 8, a method 800 is illustrated according to one embodiment. At 810, a control plane receives a first packet from a forwarding plane. At 820, the control plane associates the first packet with a first virtual switch. At 830, the control plane forms a second packet based on configuration parameters of the first virtual switch. At 840, the control plane sends the second packet to the forwarding plane. At 850, in one embodiment, the control plane receives a third packet associated with a second virtual switch from the forwarding plane. At 860, in one embodiment, the control plane forms a fourth packet based on configuration parameters of the second virtual switch. At 870, in one embodiment, the control plane sends the fourth packet to the forwarding plane.

According to another aspect of the invention, an article of manufacture includes media including programming configured to cause processing circuitry (e.g., a microprocessor) to perform processing that executes one or more of the methods described above. The programming may be embodied in a computer program product(s) or article(s) of manufacture, which can contain, store, or maintain programming, data, and/or digital information for use by or in connection with an instruction execution system including processing circuitry. In some cases, the programming may be referred to as software, hardware, or firmware.

For example, the media may be electronic, magnetic, optical, electromagnetic, infrared, or semiconductor media. Some more specific examples of articles of manufacture including media with programming include, but are not limited to, a portable magnetic computer diskette (such as a floppy diskette or a ZIP® disk manufactured by the Iomega Corporation of San Diego, Calif.), hard drive, random access memory, read only memory, flash memory, cache memory, and/or other configurations capable of storing programming, data, or other digital information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A packet switch operating method comprising:
using forwarding circuitry of the packet switch, receiving a plurality of Ethernet packets comprising Ethernet source addresses and Ethernet destination addresses from one or more first devices distinct from the packet switch, each Ethernet packet of the plurality conforming to a different one of a plurality of forwarding information formats;
the forwarding circuitry determining that a first subset of the received Ethernet packets of the plurality are to be forwarded to control circuitry of the packet switch instead of to ports of the packet switch;
the forwarding circuitry forwarding a second subset of the received Ethernet packets of the plurality to the ports without forwarding the second subset of the received Ethernet packets to the control circuitry;
the ports transmitting the second subset of the received Ethernet packets to one or more second devices connected to the packet switch via the ports;
the forwarding circuitry modifying each Ethernet packet of the first subset to conform to a common forwarding information format instead of a respective one of the plurality of forwarding information formats without modifying Ethernet source addresses or Ethernet destination addresses of the Ethernet packets of the first subset;
the forwarding circuitry forwarding the modified Ethernet packets of the first subset to the control circuitry of the packet switch; and
the control circuitry taking an action influencing a behavior of the forwarding circuitry based on the modified Ethernet packets.

2. The method of claim 1 wherein each Ethernet packet of the plurality is associated with a different one of a plurality of virtual switches of the forwarding circuitry.

3. The method of claim 1 wherein each packet of the plurality is associated with a common virtual switch but with a different one of a plurality of virtual interfaces associated with the common virtual switch.

4. The method of claim 1 wherein each of the forwarding information formats of the plurality has a different bit length.

5. The method of claim 1 wherein the common forwarding information format consists of an Ethernet destination address field and an Ethernet source address field.

6. The method of claim 1 wherein the plurality of Ethernet packets comprises a first plurality of Ethernet packets and further comprising:
in response to the forwarding circuitry forwarding the modified Ethernet packets of the first subset to the control circuitry, the control circuitry sending a second plurality of Ethernet packets from the control circuitry to the forwarding circuitry, each packet of the second plurality conforming to the common forwarding information format;
using the forwarding circuitry, modifying each packet of the second plurality to conform to a different one of the plurality of forwarding information formats; and
the forwarding circuitry forwarding the modified packets of the second plurality to the ports.

7. The method of claim 1 wherein the forwarding circuitry is connected to the ports and the control circuitry connected to the forwarding circuitry, but is not connected to the ports.

8. The method of claim 1 further comprising the forwarding circuitry forwarding some Ethernet packets of the first subset to both the ports and the control circuitry.

9. A packet switch operating method comprising:
using a forwarding plane of the packet switch, receiving an Ethernet packet comprising forwarding information, an Ethernet source address, and an Ethernet destination address from a device distinct from the packet switch, the forwarding plane being configured to forward the Ethernet packet to one or more ports of the packet switch and/or to a control plane of the packet switch based on the forwarding information;
using the forwarding plane, determining that the Ethernet packet is to be forwarded to the control plane;
subsequent to the determining, the forwarding plane modifying the Ethernet packet to have a particular forwarding information format without modifying the Ethernet source address or the Ethernet destination address;
providing the modified Ethernet packet to the control plane; and
the control plane taking an action influencing a behavior of the forwarding circuitry based on the modified Ethernet packet.

10. The method of claim 9 wherein the packet comprises a first Ethernet packet and prior to the modifying, the forwarding information of the first Ethernet packet is arranged in an original forwarding information format different than the particular forwarding information format and further comprising:
using the forwarding plane, receiving a second Ethernet packet comprising second forwarding information different than the first forwarding information, the second forwarding information being arranged in the original forwarding information format;
the forwarding plane modifying the second Ethernet packet to have the particular forwarding information format; and
the forwarding plane providing the modified second Ethernet packet to the control plane.

11. The method of claim 9 wherein the control plane is configured to generate another packet in response to receiving and processing the modified Ethernet packet.

12. The method of claim 9 wherein the control plane is configured to modify a configuration of the forwarding plane based on contents of the modified Ethernet packet.

13. The method of claim 9 wherein the determining comprises determining based on a portion of the Ethernet packet that does not include the forwarding information.

14. The method of claim 9 wherein the Ethernet packet comprises an Institute of Electrical and Electronics Engineers (IEEE) 802.1ag connectivity fault management protocol data unit (CFMPDU), an International Telecommunications Union—Telecommunications (ITU-T) Y.1731 Ethernet OAM packet, or an Internet Group Management Protocol (IGMP) packet.

15. The method of claim 9 wherein the Ethernet packet is addressed to an Internet Protocol interface of the control plane.

16. The method of claim 9 wherein the modifying comprises removing one of a Virtual Local Area Network (VLAN) identifier, a Multiprotocol Label Switching (MPLS) label, or a service instance identifier (I-SID) identifier from the Ethernet packet.

17. A packet switch operating method comprising:
  using a forwarding plane of the packet switch, receiving an Ethernet packet from a control plane of the packet switch, the Ethernet packet comprising first forwarding information arranged in a first format, an Ethernet source address, and an Ethernet destination address, and the Ethernet packet being created by the control plane;
  using the forwarding plane, modifying the Ethernet packet to comprise second forwarding information arranged in a second format without modifying the Ethernet source address or the Ethernet destination address, the second format being different than the first format and wherein at least a portion of the second forwarding information is not comprised by the first forwarding information; and
  using the forwarding plane, forwarding the modified Ethernet packet to at least one port of the packet switch.

18. The method of claim 17 wherein the first forwarding information comprises an Ethernet destination address and an Ethernet source address and prior to the modifying the Ethernet packet is devoid of a VLAN identifier, an MPLS label, and an I-SID.

19. A packet switch operating method comprising:
  using a control plane of the packet switch, receiving a first packet from a forwarding plane of the packet switch, the forwarding plane comprising a plurality of virtual switches, the forwarding plane associating the first packet with one virtual switch of the plurality, and the first packet being devoid of an identifier of the one virtual switch;
  in response to the receiving of the first packet, using the control plane to form a second packet based on configuration parameters of the one virtual switch, the second packet being devoid of the identifier of the one virtual switch;
  using the control plane, sending the second packet to the forwarding plane; and
  wherein the virtual switches of the plurality comprise different packet-forwarding domains relative to one another and the packet-forwarding domains are associated with different subsets of a set of ports of the packet switch relative to one another, individual packet-forwarding domains of the plurality being constrained to receive packets from and forward packets to only ports of the subset associated with the individual packet-forwarding domain.

20. The method of claim 19 wherein the one virtual switch comprises a first virtual switch and further comprising:
  using the control plane, receiving a third packet from the forwarding plane, the third packet being associated with a different second virtual switch of the plurality and the third packet being devoid of an identifier of the second virtual switch;
  in response to the receiving of the third packet, using the control plane to form a fourth packet based on configuration parameters of the second virtual switch, the fourth packet being devoid of the identifier of the second virtual switch; and
  using the control plane, sending the fourth packet to the forwarding plane.

21. The method of claim 19 wherein the control plane is unable, based only on the first packet, to determine which of the virtual switches the first packet is associated with.

22. The method of claim 19 further comprising using the forwarding plane, sending a message distinct from the first packet to the control plane informing the control plane that the first packet is associated with the one virtual switch.

23. A packet switch comprising:
  ports configured to send and receive packets;
  control circuitry; and
  forwarding circuitry connected to the ports and to the control circuitry and configured to receive a plurality of Ethernet packets from the ports, each packet of the plurality having a different forwarding information format and comprising an Ethernet source address and an Ethernet destination address; to modify each of the Ethernet packets of the plurality to have a common forwarding information format instead of the different forwarding information formats without modifying the Ethernet source address or the Ethernet destination address; and to forward the modified packets of the plurality to the control circuitry wherein the control circuitry is not directly connected to the ports other than via the forwarding circuitry.

24. The packet switch of claim 23 wherein the forwarding circuitry is configured to forward packets received from the control circuitry to one or more of the ports.

25. The packet switch of claim 23 wherein the control circuitry is physically distinct from the forwarding circuitry.

* * * * *